US007765591B2

(12) United States Patent
Rabadan et al.

(10) Patent No.: US 7,765,591 B2
(45) Date of Patent: Jul. 27, 2010

(54) METHOD AND SYSTEM FOR PRIORITIZING SECURITY OPERATIONS IN A COMMUNICATION NETWORK

(75) Inventors: Carlos Lopez Rabadan, San Jose, CA (US); Jordi Juan Guillem, San Jose, CA (US); Swaminathan Sankar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1066 days.

(21) Appl. No.: 11/123,661

(22) Filed: May 5, 2005

(65) Prior Publication Data

US 2006/0253902 A1 Nov. 9, 2006

(51) Int. Cl.
*G06F 15/16* (2006.01)
(52) U.S. Cl. ....................................... 726/13
(58) Field of Classification Search ................ 726/13
See application file for complete search history.

(56) References Cited

U.S. PATENT DOCUMENTS

| 5,826,014 | A | 10/1998 | Coley et al. |
| 6,816,973 | B1 | 11/2004 | Gleichauf et al. |
| 7,092,357 | B1 * | 8/2006 | Ye ............................. 370/230 |
| 7,295,516 | B1 * | 11/2007 | Ye ............................. 370/232 |
| 2002/0105911 | A1 * | 8/2002 | Pruthi et al. ................ 370/241 |
| 2004/0047356 | A1 * | 3/2004 | Bauer ......................... 370/401 |
| 2004/0165588 | A1 | 8/2004 | Pandya |
| 2006/0010318 | A1 * | 1/2006 | Coley et al. ................ 713/150 |

FOREIGN PATENT DOCUMENTS

WO WO 00/56034 A1 9/2000

* cited by examiner

*Primary Examiner*—Kambiz Zand
*Assistant Examiner*—Aubrey H Wyszynski
(74) *Attorney, Agent, or Firm*—Trellis IP Law Group, PC

(57) ABSTRACT

A method, system and apparatus for filtering data packets through an integrated network security device are provided. Various security operations are performed on the data packets belonging to a network connection while they pass through the integrated network security device in a communication network. A classification engine is applied to the first packet of the connection. The result of this filtering is stored in a per-connection control key, and determines which of the security operations must be applied to each of the data packets of the connection. These security operations may be prioritized and re-ordered, based on the rate at which they detect and drop malicious data packets.

12 Claims, 5 Drawing Sheets

METHOD AND SYSTEM FOR PRIORITIZING SECURITY OPERATIONS IN A COMMUNICATION NETWORK

BACKGROUND OF THE INVENTION

1. Field of Invention

Embodiments of the invention relate in general to filtering of data packets over network security devices in a communication network. More specifically, the embodiments of the invention relate to methods and systems for enhancing the performance of network security devices.

2. Description of the Background Art

In the field of packet-switched network devices, different security technologies such as VPN, SSL, Firewall, IDS, TLS, IPS and content filtering, are merging into a single platform. Therefore, the operations that used to be performed at the various network security devices to each of the data packets being transmitted are now performed in a single device.

Network security devices maintain information relating to various network connections, in the form of per-connection objects. First, network connections are filtered through a classification engine that determines which functionalities (also called plug-in modules, applications or operations) need to be applied to packets belonging to a connection. This decision is then stored in a connection object as a control key. A dispatcher unit processes the control key and sends the packets to the required applications, either in the order specified by the control key or in a given coded order (as programmed by the engineer who developed the device).

It is known that data packets may be dropped in a security device based on any arbitrary policies. Early detection of such to-be-dropped data packets results in an increase in the device's performance. Once a data packet is tagged to be dropped, its further processing becomes redundant, thereby improving performance.

In conventional techniques, the order in which security operations are placed is static, aimed to maximize throughput of the network security devices, and is based on empirical or design analysis. These include the ordering of various security operations, based on a general traffic pattern assumed or studied by the network security device developer engineer. However, they do not adapt to the specific network traffic pattern.

Further, several low-level programming techniques, such as parallelism and compiler optimization, are also available to maximize the performance of network security devices. However, they do not provide a dynamic method for improving this performance.

Additionally, the performance of the network security devices can be improved by using techniques such as Random Early Detection (RED). RED uses a statistical approach to dropping attacking packets in different network connections, based on the bandwidth of each connection. However, it does not use any feedback from the dropped-packet counter-analysis, to improve the performance.

To summarize, in conventional techniques, the performance of network security devices is statically controlled; and in terms of throughput, is limited by CPU processing power. The performance may potentially be improved if there is a high load of attacking packets. These malicious packets, if detected by the security device policies, can be dropped earlier than legitimate packets, hence saving CPU processing power for the processing of additional packets. Further, conventional techniques may not be able to identify the attacking packets early enough so as to skip redundant processing and save CPU processing cycles.

DETAILED DESCRIPTION OF EMBODIMENTS OF THE INVENTION

Various embodiments of the invention provide a method, a system, and a computer-readable medium for filtering of data packets through a network security device. In accordance with various embodiments of the invention, security operations such as, Virtual Private Network (VPN) layer, Secure Sockets layer (SSL), firewall, Intrusion Prevention System (IPS), etc, and their combinations thereof, are performed on the data packets to eliminate attacking or malicious data packets.

In an embodiment of the invention, a method for filtering the data packets through the network security device has been provided. This method performs a plurality of security operations on each of the data packets. The method also records the rate of the attacking or malicious data packets that are dropped while each of the security operations is being performed. Accordingly, a plurality of security operations may be re-ordered, based on the rate of data packets that are dropped by them. The security operations that drop more data packets than other security operations may be accorded a higher priority.

The dynamic re-ordering of the security operations also depends upon the interdependency of various security operations. For example, security operation A is required to be performed before security operation B, but these two security operations cannot be re-ordered between them. Further, the condition may not be the same when re-ordering of other security operations is required, such as security operation A and security operation C may be re-ordered. Accordingly, various embodiments of the invention may include a database containing prerequisites and relationships between various security operations. This may dictate the re-ordering of the security operations. In an embodiment of the invention, every security operation is independent of each other, thereby allowing re-ordering of the various security operations. In another embodiment of the invention, all security operations are interdependent, resulting in a unique sequence. This does not allow re-ordering of any security operation.

In an embodiment of the invention, a system for filtering of data packets through the network security device has been provided. This system facilitates the method for re-ordering security operations.

Figure 1:
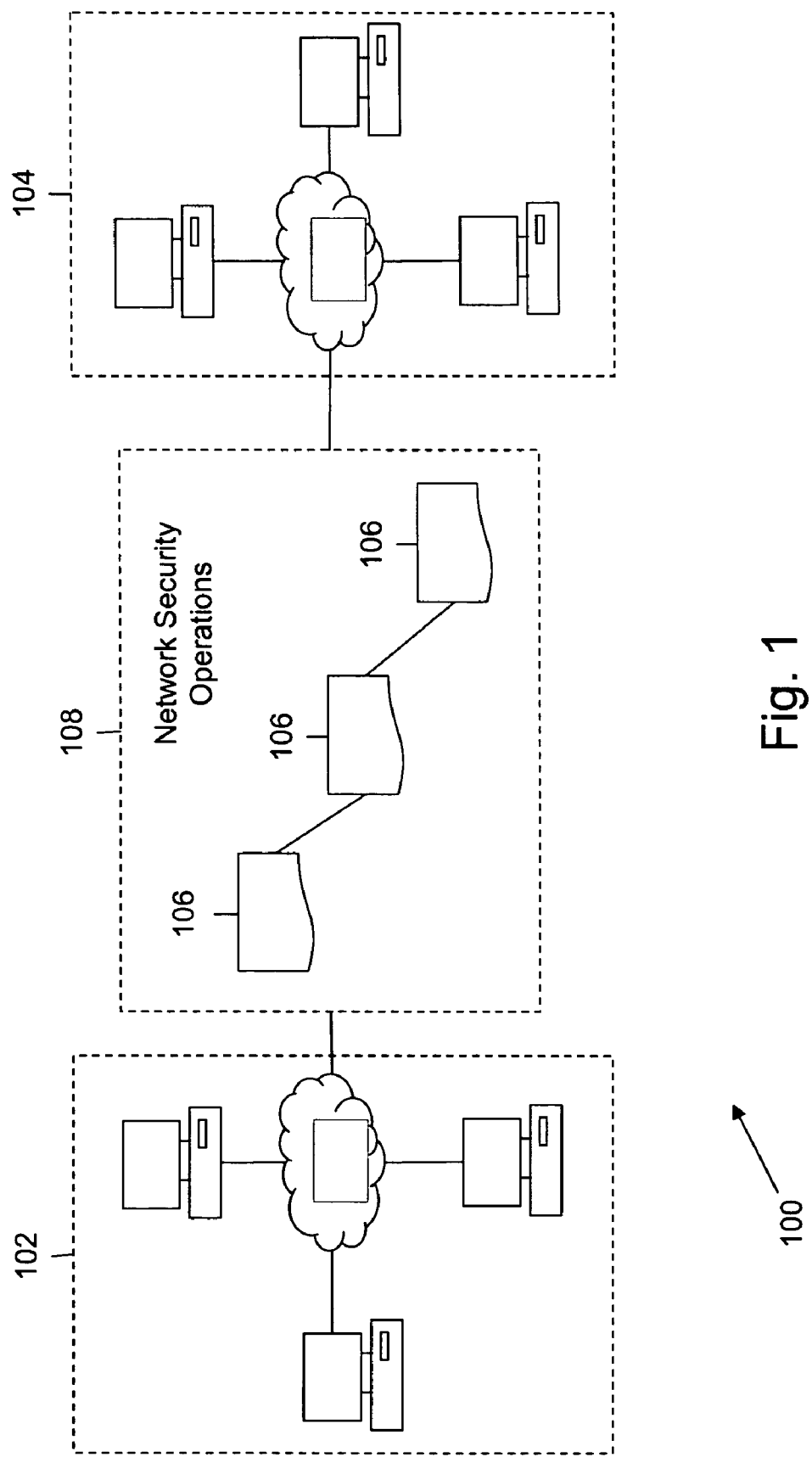
FIG. 1 illustrates a block diagram depicting a network for filtering of data packets (conventionally called 'network security'), in accordance with an exemplary embodiment of the present invention.

FIG. 1 depicts a communication network 100 for filtering of data packets that are transmitted from devices 102 to devices 104. Data is usually divided into various packets of a variable size. These data packets are transmitted from devices 102 to devices 104, which may be located at different positions in communication network 100. The data packets are transmitted through a security network 108, consisting of a set of network security operations 106 that may be applied by various network security devices such as routers, switches, gateways, firewalls, intrusion detection systems, etc. or their combinations thereof. In various embodiments of the invention, the network security devices are used to maintain network connections between various devices, for example, devices 102 and devices 104. In an embodiment of the invention, the network security devices facilitate various security operations 106 that are to be performed on the data packets transmitted through them.

Figure 2:
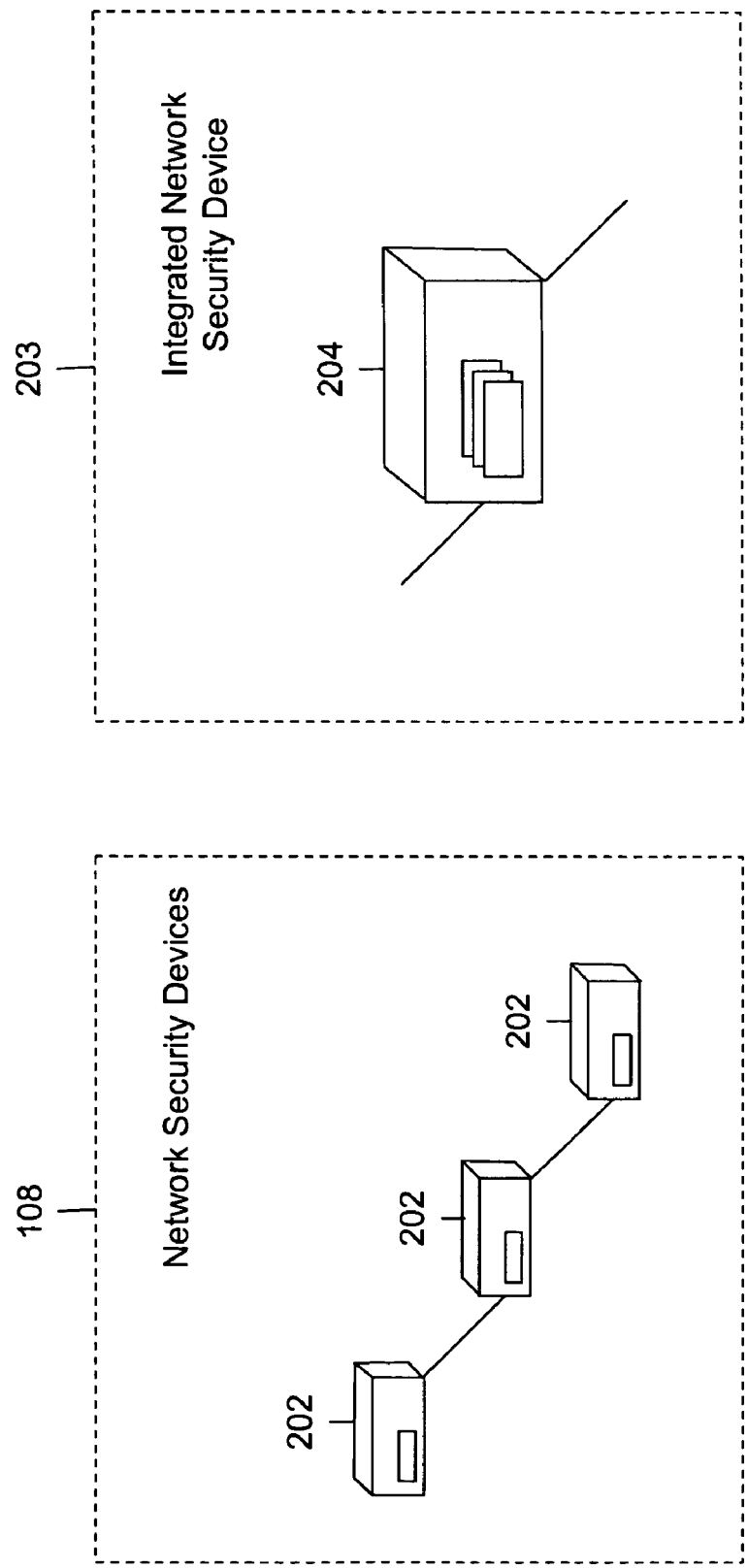
FIG. 2 illustrates a block diagram depicting a conventional multi-device network security setup and a network device providing integrated network security in accordance with an exemplary embodiment of the present invention.

FIG. 2 depicts two implementations of security network 108. Security network 108 is conventionally implemented by using multiple network security devices 202, each of them applying a single or limited set of network security operations 106. This exemplary security network 108 does not provide the re-ordering flexibility. A security network 203 depicts the implementation of a security network using a single integrated network security device 204 in accordance with an embodiment of the invention. In various embodiments of the invention, network security device 204 is able to apply multiple security operations 106 in any arbitrary order, thereby providing re-ordering flexibility. It is to be understood that security network 108 (comprising multiple security operations 106) may be implemented as either security network 108 (multiple devices 202) or security network 203 (one integrated security device 204).

Figure 3:
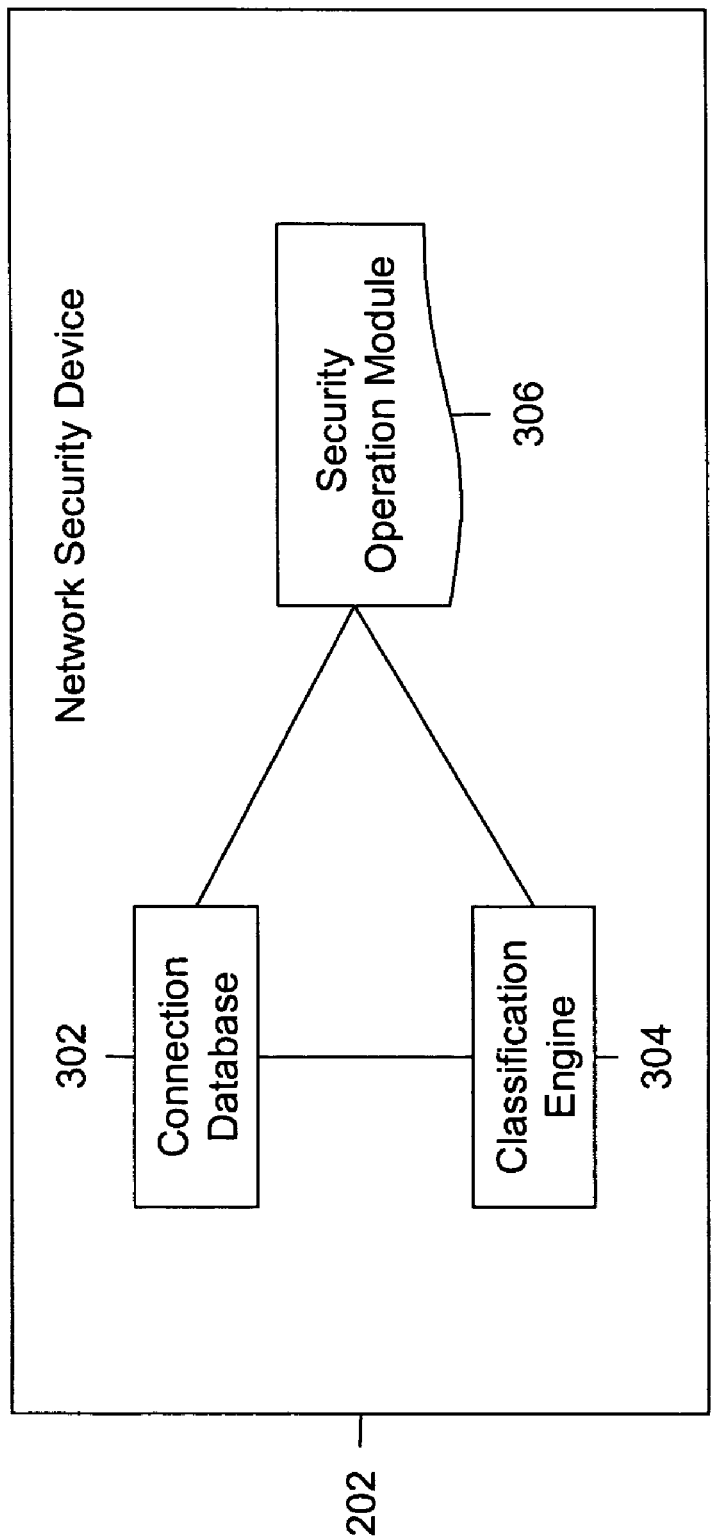
FIG. 3 is a block diagram depicting elements of a single-operation network security device for filtering data packets, in accordance with an exemplary embodiment of the present invention.

FIG. 3 is a block diagram depicting elements of a single-operation network security device for filtering data packets, in accordance with an exemplary embodiment of the present invention. As shown in the figure, network security devices 202 and 204 include a connection database 302. In an embodiment of the invention, connection database 302 maintains the connection objects of various network connections. In various embodiments of the invention, the connection objects include dynamic information relating to network connections. A classification engine 304 filters the first data packet to be transmitted through a network connection. The result of this filtering is stored in the form of a per-connection control key. In an embodiment of the invention, the various network connections may be filtered through classification engine 304 such as the Cisco™ control engine, which further determines the functionality that need to be applied to the data packets being transmitted through a particular network connection. The functionality may include plug-in modules, applications or operations. In an embodiment of the invention, this functionality is security operations, to be applied on the data packets to detect malicious data packets. The control key may further be retrieved from connection objects.

In an embodiment of the invention, network security devices 202 and 204 maintain the connection objects of various network connections. In an embodiment of the invention, connection database 302 and classification engine 304 may not form a part of network security device 202 and 204. In an embodiment of the invention, connection database 302 and classification engine 304 may function independently of network security device 202 and 204.

In various embodiments of the invention, classification engine 304 may be implemented in the form of software, firmware, hardware or their combination thereof.

Network security devices 202 and 204 include a security operations module 306 for performing a security operation on the data packets that are being transmitted through it. For the embodiment depicted in FIG. 3, security operations module 306 performs single security operation on the data packets being transmitted. Security operations module 306 may detect the attacking data packets, hereinafter referred to as malicious data packets. In an embodiment of the invention, the malicious data packets may include errors in fields containing IP addresses. The IP addresses may either be source addresses or destination addresses of the data packets. In an embodiment of the invention, the malicious data packets may be viruses or worms, which are intended to infect or corrupt the applications running on various devices 102 or 104. In an embodiment of the invention, the malicious data packets may be the unauthenticated data packets. In another embodiment of the invention, the malicious data packets may cause a Distributed Denial of Services (DDoS) attack in communication network 100. In still another embodiment of the invention, the malicious data packets may contain erroneous header fields.

The malicious data packets may be detected and dropped by performing security operations, in accordance with various embodiment of the invention. Security operations module 306 may include, although not limited to, Virtual Private Network (VPN) layer, Secure Sockets layer (SSL), firewall, Intrusion Prevention System (IPS), Transport Layer Security (TLS), Intrusion Detection System (IDS), Internet Content Control (ICC), Access Control List (ACL), content filtering, or their combination thereof.

Figure 4:
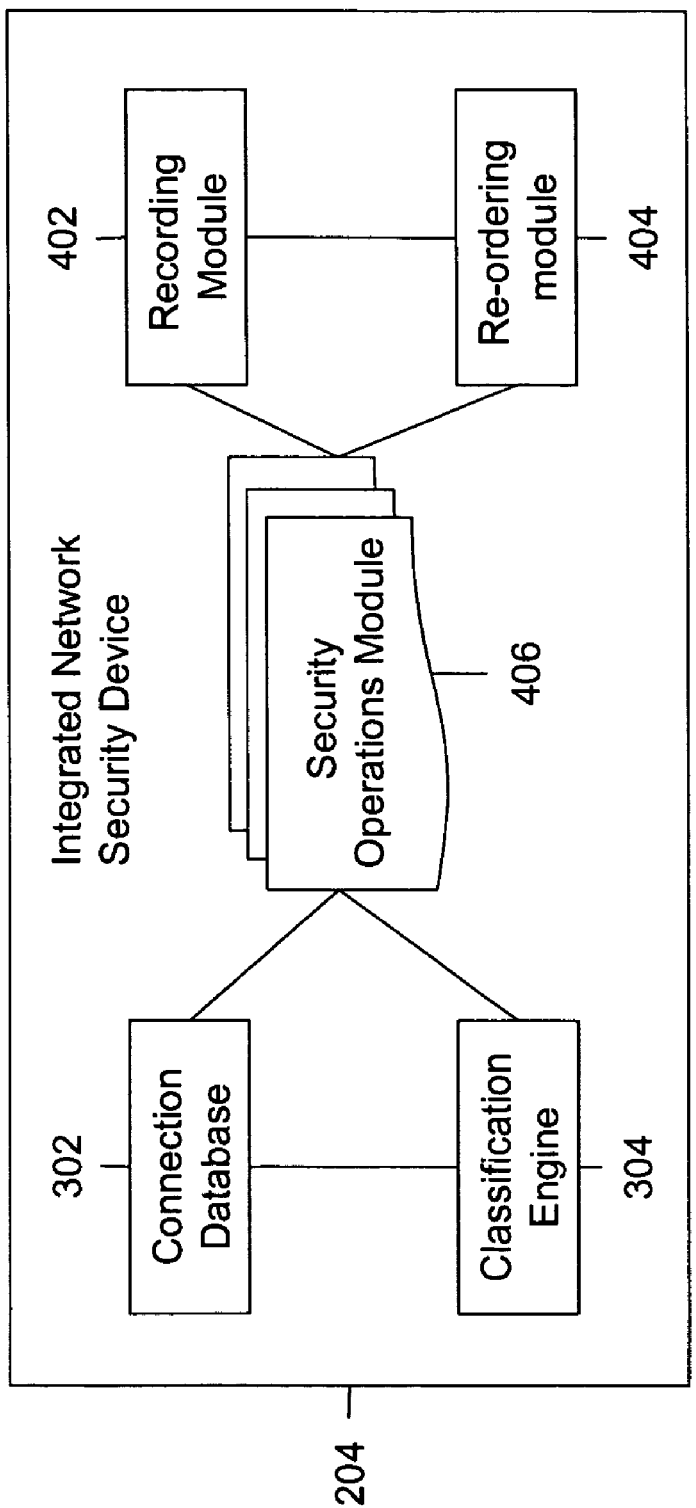
FIG. 4 is a block diagram depicting elements of a multi-operation integrated network security device for filtering data packets, in accordance with an exemplary embodiment of the present invention.

FIG. 4 is a block diagram depicting elements of integrated network security device 204 for filtering data packets, in accordance with an exemplary embodiment of the present invention. Integrated network security device 204 is capable of performing multiple security operations on the data packets being transmitted through it. The multiple security operations are performed via security operations module 406, which is similar to security operation module 306.

Performing multiple security operations on data packets involves various central processing unit (CPU) processing cycles. For example, many CPU processing cycles are consumed in detecting and thereinafter dropping the malicious data packets. Some malicious data packets may not be detected by security operations at first, and need to pass through subsequent security operations before being detected and dropped. For example, a malicious data packet may not be detected by a firewall at first, but is subsequently detected by IDS. This may result in wastage of CPU processing cycles, which otherwise would have been used for transmitting subsequent data packets.

Throughput may be defined as the amount of work a device can perform in a given time. In an embodiment of the invention, the throughput is defined as the amount of data that is successfully transmitted through a device or from one place to another in a network.

In various embodiments of the invention, the throughput of security network 108 is enhanced by appropriately re-ordering the sequence of security operations 106, the security operations being independent of each other. In an embodiment of the invention, a physical re-ordering of network security devices 202 can be performed. In various embodiments of the invention, the security operations on integrated network security device 204 are automatically re-ordered based on a method described in conjunction with FIG. 5.

In integrated network security device 204, a recording module 402 records the rate of dropped malicious data packets by each of the security operations. In various embodiments of the invention, recording module 402 may be implemented in the form of software, firmware, hardware or their combination thereof.

Further, a re-ordering module 404 re-orders the security operations, depending on the rate of the dropped malicious data packets by each security operation. In various embodiments of the invention, re-ordering module 404 may be implemented in the form of software, firmware, hardware or their combination thereof.

Figure 5:
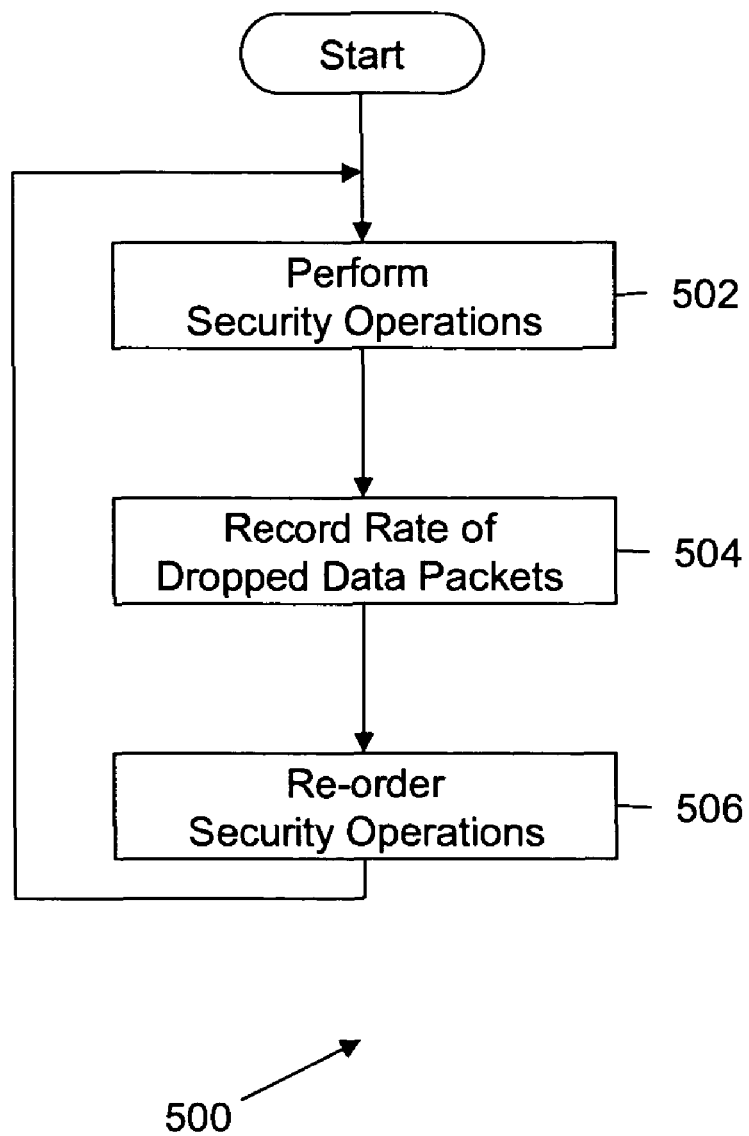
FIG. 5 is a flow diagram depicting a method for reordering network security operations in an integrated network security device based on drop packet rates, in various embodiments of the invention.

FIG. 5 illustrates a method for re-ordering security operations, to optimize usage of CPU processing cycles on integrated network security device 204. At step 502, security operations are performed on data packets that are to be transmitted through device 204. For example, the data packets may be transmitted from devices 102 to devices 104. In an embodiment of the invention, the security operations may be performed in arbitrary order. In another embodiment of the invention, the security operations may be performed in the order specified by the control key. In various embodiments of the invention, data packets also include malicious data packets along with the actual/non-malicious data packets. Details pertaining to security operations and detection of malicious data packets are described later.

At step 504, recording module 402 records the rate at which the malicious data packets are dropped during each security operation. In an embodiment of the invention, the malicious data packets generally follow a deterministic and detectable pattern that results in more data packets being consistently dropped by a specific network security operation. In various embodiments of the invention, the spread of viruses or worms amongst the data packets also follows a deterministic and detectable pattern. In various embodiment of the invention, recording module 402 detects the pattern of the malicious data packets. In addition to this, recording module 402 also records the rate of the dropped malicious data packets by each security operation. In an embodiment of the invention, the rate may be the current rate of dropped data packets. In another embodiment of the invention, the rate may be averaged over a period of time. Accordingly, most effective security operations amongst various security operations are found. In an embodiment of the invention, the most effective security operations are more likely to detect and drop malicious data packets than other security operations.

At step 506, security operations are re-ordered. In an embodiment of the invention, the re-ordering of security operations is based on the recorded pattern of the malicious data packets. In various embodiments of the invention, dropped data packets counter-analysis is used to prioritize various security operations. In an embodiment of the invention, the security operations are re-ordered, depending on the likelihood of the malicious data packets being detected. In various embodiments of the invention, this may be gauged by the rate at which the security operations drop the malicious packets, and may be used to prioritize security operations.

In various embodiments of the invention, detection of malicious data packets includes correlating the layer 2 and layer 4 fields. Layer 2 is the Data Link Layer of the Open Systems Interconnection (OSI) reference model. Layer 2 fields include the Medium Access Control (MAC) address of the data packets. Layer 4 is the Transport Layer of the OSI reference model. Layer 4 fields are used for Quality of Services (QoS) and transmission mechanisms. Layer 4 monitors security and policy preferences and enables security and policy administrators to test, edit, provide and audit fine-grained security and policy configurations. In various embodiments of the invention, the payload content of the data packets, with respect to the Application Layer (layer 7) of the OSI reference model, is also inspected. In an embodiment of the invention, viruses and worms are detected as malicious data packets, when an inspection is carried out with respect to the layer 7.

In an embodiment of the invention, the security operation with the maximum rate of dropping malicious data packets is given the highest priority. Accordingly, various security operations are prioritized, in accordance with their rates of dropping malicious data packets. Thereinafter, security operations are re-ordered and performed according to a decreasing order of priority.

In an embodiment of the invention, the re-ordering of security operations may be performed periodically. In accordance with an embodiment of the invention, a network administrator may determine the time period for re-ordering. In an embodiment of the invention, the time period may be determined by the rate of change in the pattern of malicious data packets. In an embodiment of the invention, the security operations may be dynamically re-ordered, depending on the current pattern of malicious data packets. In an embodiment of the invention, the re-ordering of security operations may not be allowed to occur frequently, thereby avoiding the flip-flop effect, i.e., frequent re-ordering of security operations.

In an embodiment of the invention, if the majority of malicious data packets are detected by the first security operation, it may not be necessary for these security operations to be re-ordered. In an embodiment of the invention, the security operations are statistically re-ordered to reduce overall CPU processing cycles that are required for detecting and dropping malicious data packets.

It is to be noted that the data packets undergo all the security operations indicated by the control key, in accordance with various embodiments of the invention. The various embodiments of the invention allow early detection and dropping of malicious packets by identifying the most effective security operations for a given pattern of malicious data packets. The most effective security operations are defined as those security operations that detect and drop a greater number of data packets, when compared with the rest of the security operations.

The above-described method is hereinafter further explained with the help of an example simulation.

A simulating program to inject data packets has been provided. The time required by each data packet, either to be transmitted in the system or to be dropped, is calculated.

It is noted that the total time required to process the data packets lowers after re-ordering security operations. This holds true when the likelihood of detecting malicious data packets is different for every security operation, these security operations being orderable as per their efficiency. In a random pattern of traffic, the total time for processing data packets remains the same as there is no consistently effective security operation that can be prioritized over the rest.

The following are initial ordering schema and execution time values used on the exemplary simulated system:
Number of simulated L4-L7 operations: 4
Processing time and default ordering:
1—TCP checks=20 t
2—IDS atomic=10 t
3—IDS heuristic=50 t
4—ACL=30t Here 't' may represents either an arbitrary unit of time or an arbitrary number CPU cycles required by each security operation for processing the data packets.

For subsequent packets, the sequence of security operations can be re-ordered, to improve their effectiveness. In the simulation program, if malicious data packets are patterned so that most of them are dropped at TCP checks, re-ordering of security operations will not be required. However, if the malicious data packets are patterned so that more data packets are dropped by IDS atomic check, re-ordering IDS atomic check as the first security operation results in an improvement of 5 percent over the first case. Similarly, for the appropriate pattern of malicious data packets, an improvement of 22 percent is measured if the IDS heuristic is the most effective security operation, and accordingly, accorded the highest priority while re-ordering. However, if most of the malicious data packets are detected at the ACL lookup, an improvement of approximately 29 percent is observed when the sequence of execution of security operations is re-ordered. Therefore, re-ordering of security operations on integrated network security devices 204 can be effective in increasing the performance of security network 203.

To summarize, the various embodiments of the invention provide early detection of malicious data packets, and thereby save CPU processing cycles. Further, the embodiments of the invention allow a re-arrangement of security operations performed, based on a specific network traffic pattern.

The various embodiments of the invention provide the advantage of increasing the throughput of network security device 204. In various embodiments of the invention, the throughput of network security devices 204 is optimized, and malicious data packets are optimally detected and dropped by security operations. Therefore, the throughput of network security devices 204 may be increased when they are attacked by malicious data packets that follow a particular detectable pattern.

Another advantage of the various embodiments of the invention is the adaptation of network security devices 204 to a specific traffic pattern, resulting in enhanced elimination of malicious data packets. This means that some of the CPU processing cycles need not be used, and can be utilized for processing other data packets. Various embodiments of the invention are based on statistical methods rather than on potentially biased empirical ones. This results in dynamic performance of network security systems.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    performing a plurality of different security operations on each of a plurality of data packets at a single network security device, the plurality of security operations including dropping of malicious data packets;
    recording a rate of malicious data packets being dropped by each of the plurality of security operations;
    associating a priority to each security operation based on a rate of malicious data packets being dropped such that a given security operation having a higher rate of malicious data packets being dropped has a higher priority than a given security operation having a lower rate of malicious data packets being dropped; and
    re-ordering the plurality of security operations at the network security device, the re-ordering being based on a decreasing order of priority, wherein the plurality of security operations are re-ordered automatically.

2. The method of claim 1, wherein the results of the re-ordering are stored in a per-connection control key, and wherein the re-ordering is applied to data packets of a particular connection.

3. The method of claim 1, wherein security operations are re-ordered periodically, and a time period for periodically re-ordering the operations is based on the changes in the rates of the malicious data packets being dropped.

4. The method of claim 1, wherein a pattern of the malicious data packets being dropped by the each of the plurality of security operations is recorded.

5. The method of claim 1, wherein the re-ordering of the plurality of security operations comprises determining the most effective security operations amongst the plurality of security operations, the most effective security operation being able to detect and drop the malicious data packets.

6. A system comprising:
    means for performing a plurality of different security operations on each of a plurality of data packets at a single network security device;
    means for recording a rate of malicious data packets being dropped by each of the plurality of security operations;
    means for associating a priority to each security operation based on a rate of malicious data packets being dropped such that a given security operation having a higher rate of malicious data packets being dropped has a higher priority than a given security operation having a lower rate of malicious data packets being dropped; and
    means for re-ordering the plurality of security operations at the single network security device, the re-ordering being based on a decreasing order of priority, wherein the plurality of security operations are re-ordered automatically.

7. A system comprising:
    one or more security operations modules, the one or more security operations module performing a plurality of different security operations on each of a plurality of data packets at a single network security device;
    a recording module for recording a rate of malicious data packets being dropped by each of the plurality of security operations module; and
    a re-ordering module for automatically re-ordering the plurality of security operations at the single network security device, the re-ordering being based on a decreasing order of priority, wherein each security operation is associated with a rate of malicious data packets being dropped such that a given security operation having a higher rate of malicious data packets being dropped has a higher priority than a given security operation having a lower rate of malicious data packets being dropped.

8. The system of claim 7 further comprising a connection-object being associated with each network connection.

9. The system of claim 7 further comprising a control key providing the plurality of security operations to be applied on the data packets.

10. The system of claim 7, wherein the network security device comprises an integrated network security device.

11. An apparatus comprising:
    a processing system including a processor coupled to a display and user input device;

a machine-readable medium including instructions executable by the processor comprising:

one or more instructions for performing a plurality of different security operations on each of a plurality of data packets at a single network security device, the plurality of security operations including dropping of malicious data packets;

one or more instructions for recording a rate of the malicious data packets being dropped by each of the plurality of security operations;

one or more instructions for associating a priority to each security operation based on a rate of malicious data packets being dropped such that a given security operation having a higher rate of malicious data packets being dropped has a higher priority than a given security operation having a lower rate of malicious data packets being dropped; and one or more instructions for re-ordering the plurality of security operations at a single network security device, the re-ordering being based on a decreasing order of priority, wherein the plurality of security operations are re-ordered automatically.

12. A non-transitory machine-readable medium including instructions executable by a processor, the machine-readable medium comprising:

one or more instructions for performing a plurality of different security operations on each of a plurality of data packets at a single network security device, the plurality of security operations including dropping of malicious data packets;

one or more instructions for recording a rate of the malicious data packets being dropped by each of the plurality of security operations;

one or more instructions for associating a priority to each security operation based on a rate of malicious data packets being dropped such that a given security operation having a higher rate of malicious data packets being dropped has a higher priority than a given security operation having a lower rate of malicious data packets being dropped; and one or more instructions for re-ordering the plurality of security operations at a single network security device, the re-ordering being based on a decreasing order of priority, wherein the plurality of security operations are re-ordered automatically.

* * * * *